United States Patent
Wooten et al.

(10) Patent No.: US 8,200,952 B2
(45) Date of Patent: Jun. 12, 2012

(54) PLATFORM AUTHENTICATION VIA A TRANSPARENT SECOND FACTOR

(75) Inventors: David R. Wooten, Redmond, WA (US); Eric Holt, Redmond, WA (US); Stefan Thom, Snohomish, WA (US); Tony Ureche, Renton, WA (US); Dan Sledz, Seattle, WA (US); Douglas M. MacIver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1247 days.

(21) Appl. No.: 11/586,283

(22) Filed: Oct. 25, 2006

(65) Prior Publication Data
US 2008/0148388 A1      Jun. 19, 2008

(51) Int. Cl.
G06F 21/00 (2006.01)
(52) U.S. Cl. ............................................. 713/2
(58) Field of Classification Search ............... 713/2
See application file for complete search history.

(56) References Cited

U.S. PATENT DOCUMENTS

| | | | |
|---|---|---|---|
| 5,869,823 | A | 2/1999 | Bublitz et al. |
| 6,351,813 | B1 | 2/2002 | Mooney et al. |
| 6,463,537 | B1 | 10/2002 | Tello |
| 6,513,721 | B1 | 2/2003 | Salmre et al. |
| 6,612,490 | B1 | 9/2003 | Herrendoerfer et al. |
| 6,754,886 | B1 | 6/2004 | Merk et al. |
| 6,945,454 | B2 | 9/2005 | Tournemille et al. |
| 7,028,090 | B2 | 4/2006 | McBearty et al. |
| 7,036,738 | B1 | 5/2006 | Vanzini et al. |
| 7,725,701 | B2 * | 5/2010 | Rios et al. .................. 713/1 |
| 2002/0087877 | A1 * | 7/2002 | Grawrock .................. 713/200 |
| 2003/0154375 | A1 | 8/2003 | Yang |
| 2005/0211759 | A1 | 9/2005 | Breslin et al. |
| 2005/0216739 | A1 * | 9/2005 | Lee et al. .................. 713/168 |
| 2006/0010317 | A1 * | 1/2006 | Lee .............................. 713/2 |

FOREIGN PATENT DOCUMENTS

| | | |
|---|---|---|
| KR | 1999-0058372 | 7/1999 |
| KR | 2000-0018098 | 4/2000 |
| KR | 2001-0087034 | 9/2001 |
| KR | 2002004368 | 1/2002 |
| KR | 1020060004584 | 1/2006 |
| WO | WO 03/088014 A2 | 10/2003 |

OTHER PUBLICATIONS

Microsoft, "Microsoft Class Drivers for USB CCID Smart Cards", Nov. 25, 2003, pp. 1-6.*
Blaze, M., "Key Management in an Encrypting File System", *Proc. Summer USENIX Technical Conference*, 1994, 9 pages, http://www.crypto.com.

(Continued)

Primary Examiner — Jeffrey D Popham
(74) Attorney, Agent, or Firm — Woodcock Washburn LLP

(57) ABSTRACT

Firmware of a system is configured to allow secondary devices, such as a smart card, to be used for authentication. In an example embodiment, the secondary device is a CCID smart card in compliance with the ISO 7816 specification. The smart card is inserted into a card reader coupled to the system prior to booting the system. The firmware comprises an emulator and driver configured to allow authentication information from the smart card to be utilized to allow execution of the boot process. In an example embodiment, the smart card comprises external keys for use with BITLOCKER™. The secondary device is compatible with systems implementing a BIOS and with systems implementing EFI. Authentication also can be accomplished via devices that do not provide data storage, such as a biometric device or the like.

18 Claims, 9 Drawing Sheets

OTHER PUBLICATIONS

Hughes, J. et al., "A Universal Access, Smart-Card-Based, Secure File System", *Presented at the Atlanta Linux Showcase*, Oct. 12-16, 1999, 10 pages, http://www.storagetek.com.

"Technical Implementation Guidance: Smart Card Enables Physical Access Control Systems", *Physical Access Interagency Interoperability Working Group*, Jul. 30, 2004, Version 2.2, 32 pages, http://www.smart.gov.

Device Class: Smart Card, CCID, Specification for Integrated Circuit(s) Cards Interface Devices, Apr. 22, 2005, Revision 1.1, 123 pages.

* cited by examiner

PLATFORM AUTHENTICATION VIA A TRANSPARENT SECOND FACTOR

TECHNICAL FIELD

The technical field related generally to computer processing and more specifically to accessing protected files.

BACKGROUND

Current processing systems provide data protection. For example, BITLOCKER™ Drive Encryption (also referred to as BITLOCKER™), a MICROSOFT® CORPORATION product, is a data protection feature available with various WINDOWS® operating systems. BITLOCKER™ prevents a user who boots another operating system or runs a software hacking tool from defeating file or system protections or performing offline viewing of the files stored on the protected drive. BITLOCKER™ protects user data and ensures that a processor running a WINDOWS® operating system (e.g., WINDOWS® VISTA) has not been tampered with while the system was offline.

BITLOCKER™ can lock the normal boot process until the user supplies a PIN, or inserts a USB flash drive that contains keying material. For example, a USB flash device can be inserted into the processing system prior to the boot process. During the boot process, the USB flash device will be recognized and keying material can be accessed therefrom. Current processing systems, however, do not recognize, during the boot process, devices such as smart cards and CCID (Integrated Circuit(s) Cards Interface Device) smart cards for this purpose.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A platform provides transparent access to protected files gated by any authentication mechanism that is supported by the firmware of the platform. The platform is capable of accepting a PIN, consuming keys from various devices such as a USB flash drive or a smart card, and is compatible with other devices that do not provide data storage, such as a biometric device or the like. In an example embodiment, platform firmware allows BITLOCKER™ to access specially provisioned files on a device (e.g., a CCID smart card) and/or access a protected BIOS (basic input/output system) portion of the device.

BRIEF DESCRIPTION OF THE DRAWINGS

The foregoing summary, as well as the following detailed description, is better understood when read in conjunction with the appended drawings. For the purpose of illustrating platform authentication via a transparent second factor, there is shown in the drawings exemplary constructions thereof; however, platform authentication via a transparent second factor is not limited to the specific methods and instrumentalities disclosed.

DETAILED DESCRIPTION OF ILLUSTRATIVE EMBODIMENTS

Figure 1:
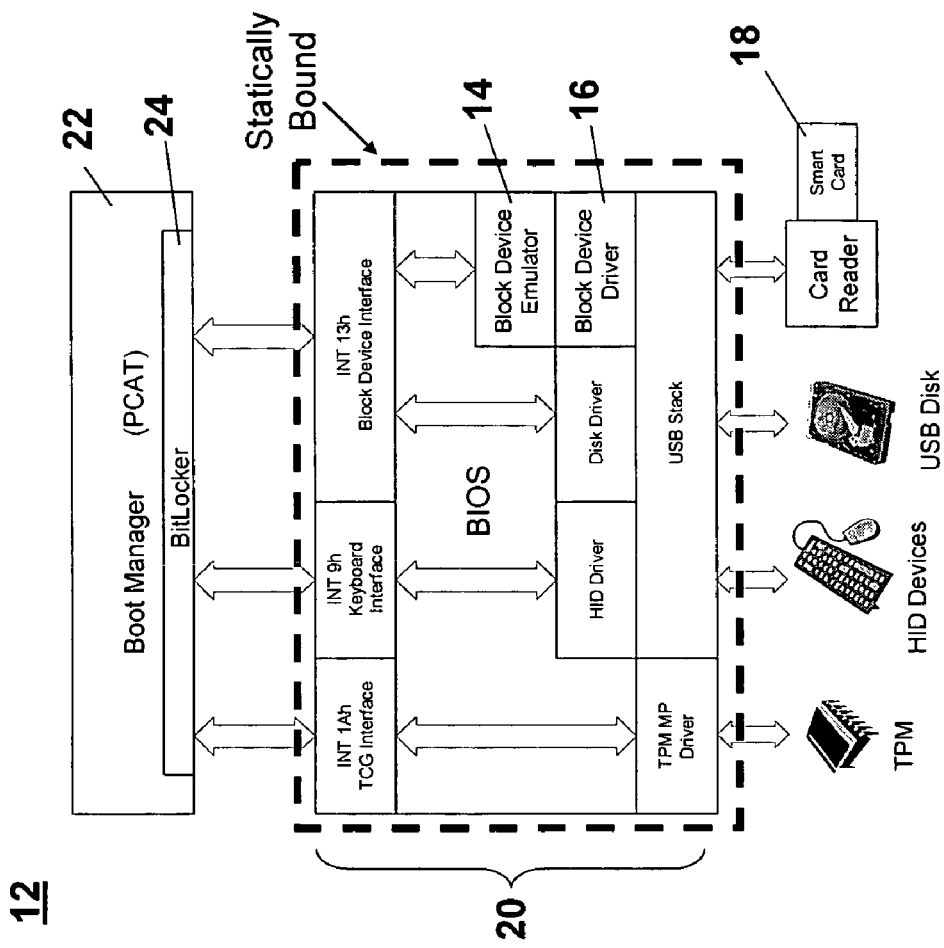
FIG. 1 is a functional block diagram of an example system for accessing a block device via a BIOS portion of the system.

A transparent second factor, or device, for supporting authentication of a platform comprises, in an example embodiment, a smart card, a CCID smart card (a Integrated Circuit(s) Cards Interface Device smart card), a biometric device (e.g., a fingerprint reader, a retina scanner, or the like), or a combination thereof, for example. A transparent second factor for supporting authentication of a platform is described herein as applied to BITLOCKER™ Drive Encryption (also referred to as BITLOCKER™), a MICROSOFT® CORPORATION product, but is not limited thereto. The second factor is transparent from the perspective of a user of the platform, in that the user need not be knowledgeable of the details of the differences between various factors.

BITLOCKER™ is capable of consuming external keys that are stored on block devices. A block device is a device that transmits and/or receives information in the form of a block, such as a hard disk drive for example. Access to a block device is provided by the firmware of the platform. A platform can comprise any appropriate processor or the like. For example, appropriate platforms can include, but are not limited to, personal computers, server computers, hand-held or laptop devices, multiprocessor systems, microprocessor-based systems, set top boxes, programmable consumer electronics, network PCs, minicomputers, mainframe computers, portable devices, portable media players, e.g., portable music players, such as MP3 players, walkmans, etc., portable computing devices, such as personal digital assistants ("PDAs"), cell phones, portable email devices, thin clients, portable gaming devices, etc., consumer electronic devices, such as TVs, DVD players, set top boxes, monitors, displays, etc., public computing devices, such as kiosks, in-store music sampling devices, automated teller machines (ATMs), cash registers, etc., navigation devices whether portable or installed in-vehicle and/or non-conventional computing devices, such as kitchen appliances, motor vehicle controls (e.g., steering wheels), etc., or a combination thereof. In an example embodiment, the firmware of the platform is configured to provide the capability to allow BITLOCKER™ to utilize, for authentication purposes, a second factor, such as a smart card, a CCID smart card, and/or a biometric device. Accordingly, BITLOCKER™ reads specially provisioned files on the block device or files in a protected BIOS area of the block device, similar to reading files from a storage device, such as a hard disk, for example.

An example smart card applicable herewith is a smart card in accordance with the ISO 7816 specification. This specification describes properties and functionality of a smart card. In an example embodiment, commands utilized to access a smart card are in accordance with the ISO 7816 specification, e.g., section ISO 7816-4, which defines basic commands to access a simple file system and the file system itself.

In an example embodiment, BITLOCKER™ keys (e.g., external keys utilized by BITLOCKER™) are stored in a file system of the block device. Upon the block device being authenticated, the keys are retrieved from the block device and subsequently utilized by BITLOCKER™ during a boot process of the platform. In an example embodiment, access to the block device is read-only access. In another example embodiment, files on the block device are protected. For example, access to a file on the block device may not be granted until a PIN, or the like, is provided. Or, as another example, only predetermined files on the block device are selected to be accessible by the platform. Thus, if the block device is lost or stolen, information on the block device is protected and can not be accessed by an unauthorized entity.

FIG. 1 is a functional block diagram of an example system 12 for accessing a block device 18 via a BIOS (basic input/output system) portion 20 of the system 12. As depicted in FIG. 1, the system 12 comprises a PCAT (PC advanced technology) compatible boot manager 22, BITLOCKER™ software 24, and BIOS portion 20. The BIOS portion 20 comprises a block device emulator portion 14 and a block device driver portion 16. The block device emulator 14 is configured to detect the block device 18 and to open a file on the block device 18. The BIOS portion 20 comprises a block device driver 16 configured to access information stored on the block device 18.

The BIOS portion 20 comprises firmware for controlling the boot process of the platform comprising the system 12. In an example embodiment, the BIOS portion 20 comprises an interrupt handler (e.g., interrupt 1A hexadecimal, INT 1Ah), for handling the interface to a trusted computing group (TCG) device such as a trusted platform module (TPM) for example, an interrupt handler (e.g., INT 9h) for handling the interface to a human interface device (HID) such as a keyboard for example, and an interrupt handler ((e.g., INT 13h) for handling the interface to a block device interface, such as universal serial bus (USB) compatible devices (e.g., USB disk, USB card reader), for example. It is emphasized that the depiction in FIG. 1 of specific interrupt handlers is exemplary, and that any interface can be used.

The BIOS portion 20 supports USB controllers and basic devices, like HID and storage block devices. In an example embodiment, the BIOS portion 20 is configured to comprise block device emulator 14 and block device driver 16 in order to be compatible with devices such as the smart card 18, or a biometric device (not shown in FIG. 1), for example. In an example embodiment, the block device driver 16 is configured and performs in accordance, at least in part, with the Specification for Integrated Circuit(s) Cards Interface Devices, such as the Specification for Integrated Circuit(s) Cards Interface Devices, Revision 1.1, for example. It is not necessary to implement the full Device Class as described in the Specification for Integrated Circuit(s) Cards Interface Devices, rather a subset of the Device Class is appropriate. For example, elements utilized to allow basic interaction with the card reader and the communication with the smart card 18, such as providing power to the smart card 18, removing power from the smart card 18, and relaying command and response APDUs (Application Protocol Data Units) to and from the smart card 18, are appropriate.

In an example embodiment, the card reader is compatible with a smart card 18 via a PCMCIA (Personal Computer Memory Card International Association, or Peripheral Component Microchannel Interconnect Architecture) interface. This embodiment provides an advantageous use for mobile computers and the like. The smart card 18 can be in the form of a card, a key fob, or any appropriate configuration.

Figure 2:
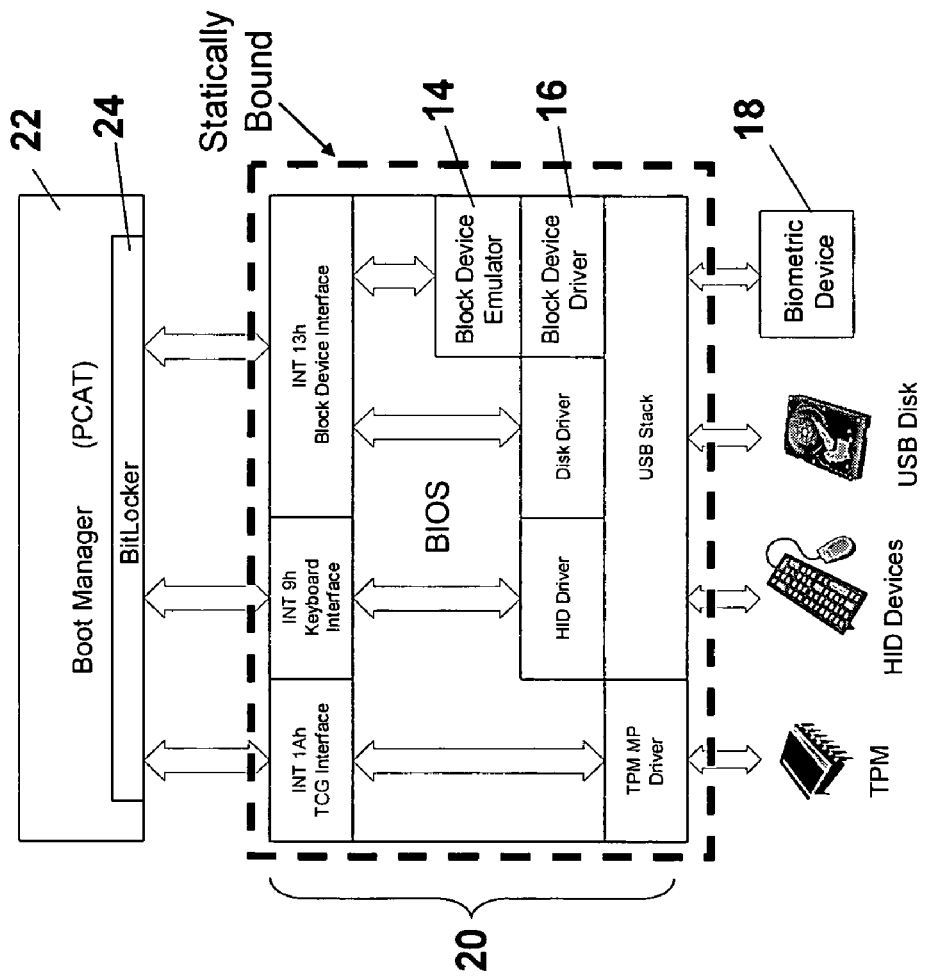
FIG. 2 is a functional block diagram of an example system for accessing a biometric device via a BIOS portion of the system.

In an example embodiment, as depicted in FIG. 2, the block device 18 comprises a biometric device, such as a fingerprint reader, a retinal scanner, or the like. Biometric devices typically do not provide data storage. In embodiments in which the block device 18 comprises a biometric device or other second factor that does not provide data storage, the firmware of the BIOS portion 20 performs authentication of the block device 18. If authentication of the block device 18 is successful, a token can be provided by the block device 18, which can be used to access a secure area of the platform that contains the keys required to proceed with the boot process, e.g., by starting BITLOCKER™. In this embodiment, the information stored in the secure area of the platform can not be read without prior successful authentication of the block device 18.

As shown in FIG. 1 and FIG. 2, the BIOS portion 20 of the platform is statically bound. That is, binding, the process of associating values with identifiers, is accomplished before the boot process or the operating system of the platform is started. Thus, the block device emulator 14 and the block device driver 16 are fixed for all types of block devices 18.

Figure 3:
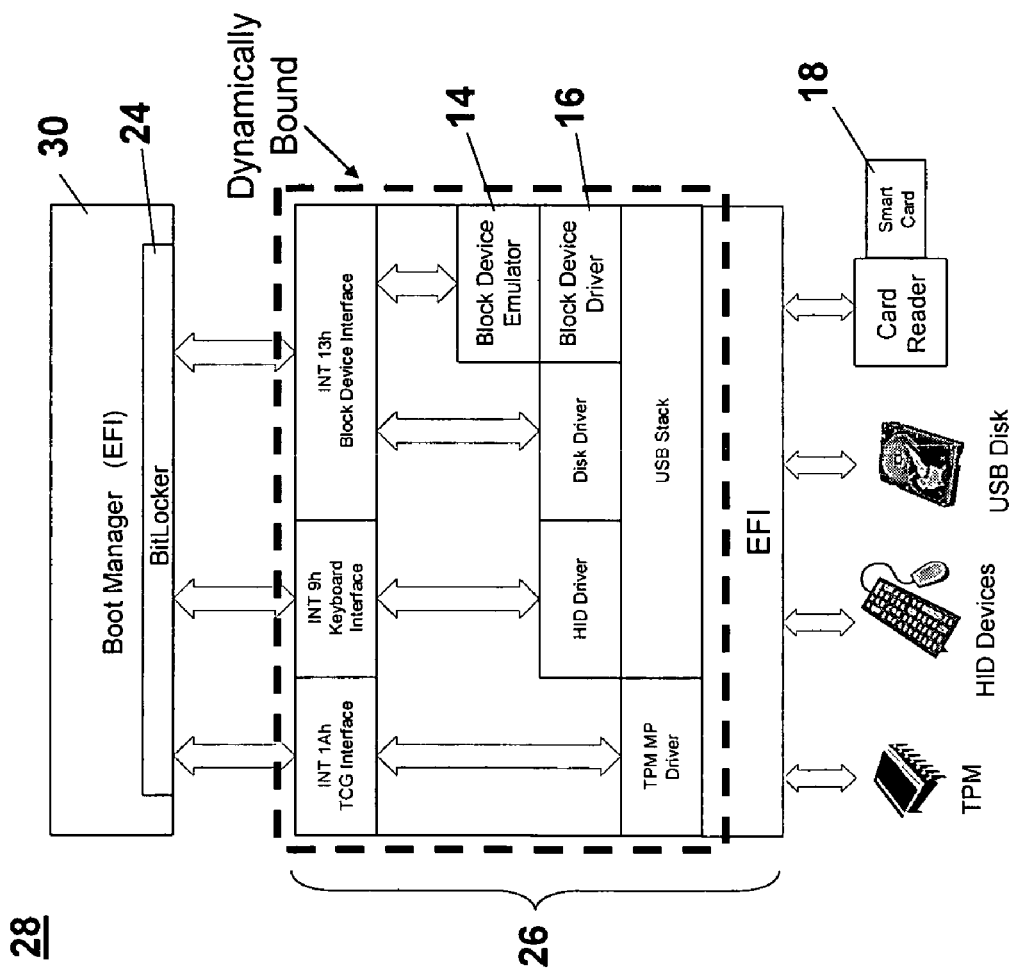
FIG. 3 is a functional block diagram of an example system for accessing a block device via an EFI of the system.

FIG. 3 is a functional block diagram of an example system 28 for accessing a block device 18 via an extensible firmware interface (EFI) 26 of the system 28. System 28 performs similarly to system 12 as described above, with the difference being the BIOS implementation of system 12 and the EFI implementation of system 28. The EFI is known to be utilized to replace the BIOS. Similar to the BIOS, EFI is responsible for controlling the boot process of an operating system and providing an interface between the operating system and hardware. The EFI 26 is dynamically bound. That is, binding is accomplished during the boot process. Thus, the block device emulator 14 and the block device driver 16 can be implemented separately and do not have to be bound to one static unit. The block device driver 16 can be loaded at EFI boot time.

As depicted in FIG. 3, the system 28 comprises an EFI compatible boot manager 30, BITLOCKER™ software 24, and EFI portion 26. The EFI portion 26 comprises a block device emulator portion 14 and a block device driver portion 16. The block device emulator 14 is configured to detect the block device 18 and to open a file on the block device 18. The EFI portion 26 comprises a block device driver 16 configured to access information stored on the block device 18.

The EFI portion 26 comprises firmware for controlling the boot process of the platform comprising the system 12. In an example embodiment, the EFI portion 26 comprises the interrupt handler for handling the interface to a trusted computing group (TCG) device such as a trusted platform module (TPM) for example, the interrupt handler for handling the interface to a human interface device (HID) such as a keyboard for example, and the interrupt handler for handling the interface to a block device interface, such as universal serial bus (USB) compatible devices (e.g., USB disk, USB card reader), for example. It is emphasized that the depiction in FIG. 1 of specific interrupt handlers is exemplary, and that any interface can be used.

The EFI portion 26 supports USB controllers and basic devices, like HID and storage block devices. In an example embodiment, the EFI portion 26 is configured to comprise block device emulator 14 and block device driver 16 in order to be compatible with devices such as the smart card 18, or a biometric device (not shown in FIG. 3), for example. In an example embodiment, the block device driver 16 is configured and performs in accordance, at least in part, with the Specification for Integrated Circuit(s) Cards Interface Devices, such as the Specification for Integrated Circuit(s) Cards Interface Devices, Revision 1.1, for example. It is not necessary to implement the full Device Class as described in the Specification for Integrated Circuit(s) Cards Interface Devices, rather a subset of the Device Class is appropriate. For example, elements utilized to allow basic interaction with the card reader and the communication with the smart card 18, such as providing power to the smart card 18, removing power from the smart card 18, and relaying command and response APDUs (Application Protocol Data Units) to and from the smart card 18, are appropriate.

In an example embodiment, the card reader is compatible with a smart card 18 via a PCMCIA (Personal Computer Memory Card International Association, or Peripheral Component Microchannel Interconnect Architecture) interface. This embodiment provides an advantageous use for mobile computers and the like. The smart card 18 can be in the form of a card, a key fob, or any appropriate configuration.

Figure 4:
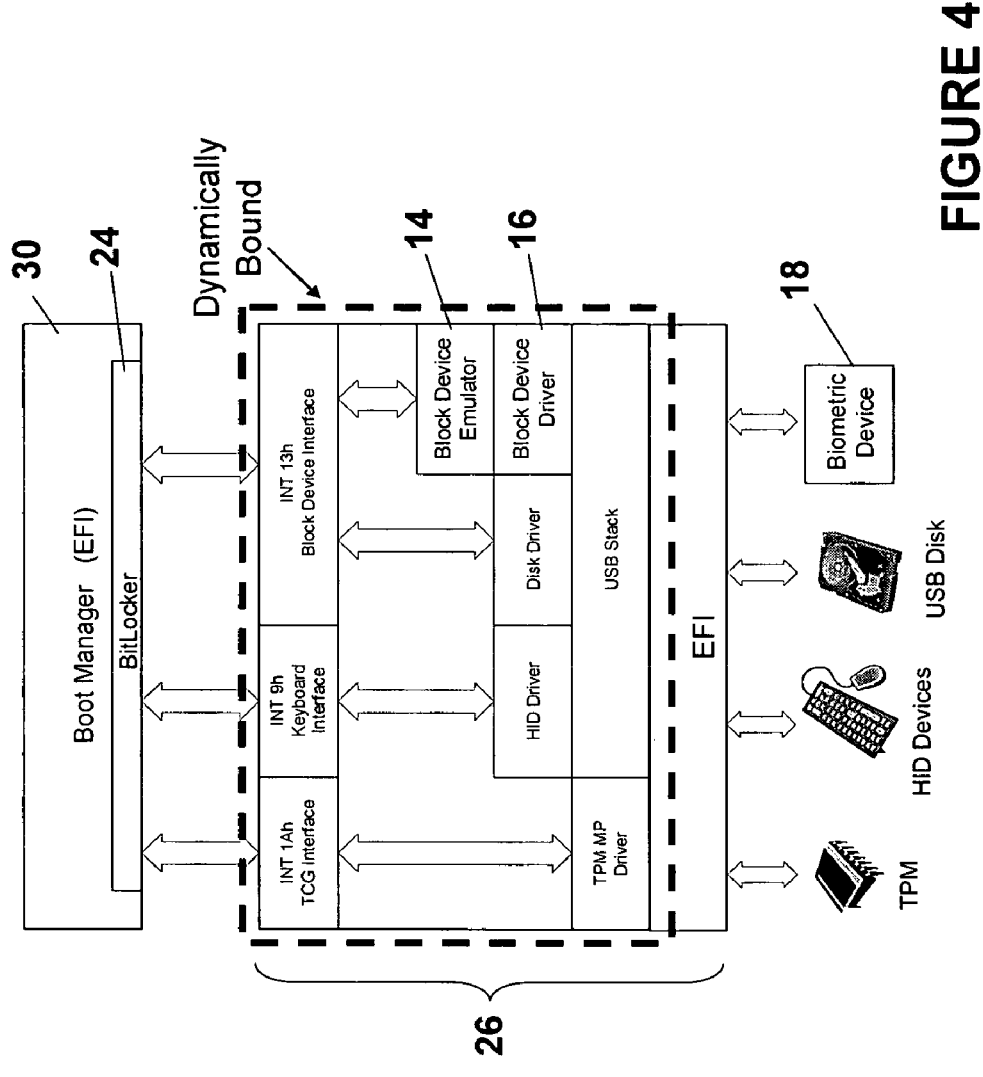
FIG. 4 is a functional block diagram of an example system for accessing a biometric device via an EFI of the system.

In an example embodiment, as depicted in FIG. 4, the block device 18 comprises a biometric device, such as a fingerprint reader, a retinal scanner, or the like. Biometric devices typically do not provide data storage. In embodiments in which the block device 18 comprises a biometric device or other second factor that does not provide data storage, the firmware of the EFI portion 26 performs authentication of the block device 18. If authentication of the block device 18 is successful, a token can be provided by the block device 18, which can be used to access a secure area of the platform that contains the keys required to proceed with the boot process, e.g., by starting BITLOCKER™. In this embodiment, the information stored in the secure area of the platform can not be read without prior successful authentication of the block device 18.

In another example embodiment, the EFI is booted on the BIOS from a hard disk, or the like.

Prior to the operating system being loaded onto the platform, the block device is authenticated. In an example embodiment, if a BIOS is implemented, the block device is authenticated before interrupt 19h on BIOS is called. That is, the block device is authenticated before the BIOS, during the boot process, starts to load the operating system. In an example embodiment, if EFI is implemented, the block device is authenticated before the boot manager is invoked on the EFI. The block device can be authenticated by any appropriate means, such as via the use of a PIN or the like, for example. After the block is successfully authenticated, a virtual block device is generated in the memory of the platform.

In order to generate the virtual block device in platform memory, the storage of the block device is searched for locations containing information that will allow the boot process to start/continue execution. The structure of the storage on the block device can comprise any appropriate structure and the location, or locations, of storage on the block device containing information allowing execution of the boot process can be identified as such in any appropriate manner.

Figure 5:
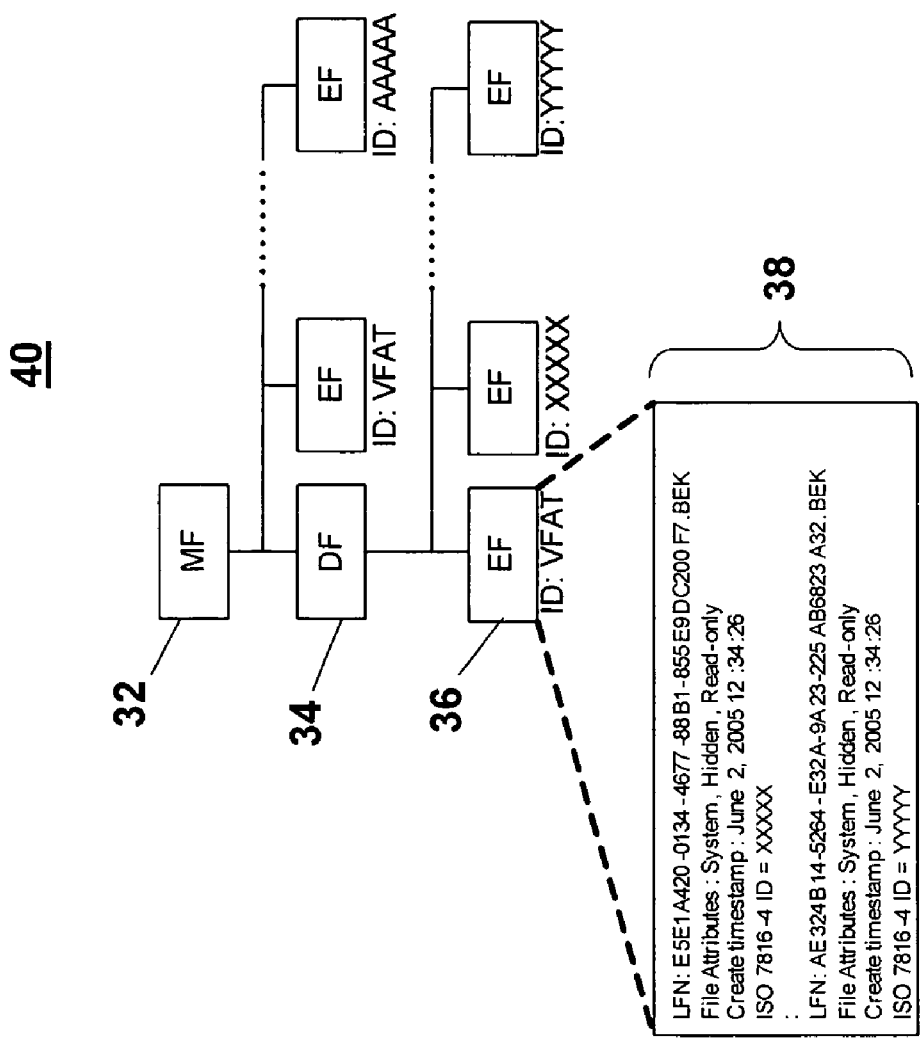
FIG. 5 is a depiction of an example file system of the block device conforming to the ISO 7816 specification.

FIG. 5 is a depiction of an example file system 40 of the block device conforming to the ISO 7816 specification. It is emphasized that the file system 40 is exemplary, and that any appropriate file system can be implemented on the block device. In an example embodiment, the file system 40 of the block device comprises at least one master file 32 (depicted as MF in FIG. 5), at least one dedicated file 34 (depicted as DF in FIG. 5), and at least one elementary file 36 (depicted as EF in FIG. 5). Only one of each type of file is labeled (32, 32, and 36) for the sake of simplicity. The hierarchy of the file system 40 is such that the dedicated file(s) and the elementary file(s) are subordinate to the master file 32. The master file 32 is the root file. A dedicated file contains file control information. A dedicated file optionally can contain an indication of memory that is available for allocation. A dedicated file can be a parent of an elementary file and/or a dedicated file can be an elementary file.

In an example embodiment, an elementary file comprises an indication that it contains information to allow the execution of the boot process. For example, an elementary file can comprise an indication that it contains keys to be utilized by BITLOCKER™. In an example embodiment, as depicted in FIG. 5, an elementary file is designated as VFAT (virtual file attribute table) to indicate that it contains information to allow execution of the boot process. An example of the type of information contained in an elementary file having an ID of VFAT is depicted in block 38. Among other information, keys utilizable by BITLOCKER™ are shown as: LFN (Logical File Name): E5E1A420-0134-4677-88B1-855E9DC200F7.BEK, and LFN: AE324B14-5264-E32A-9A23-225AB6823A32.BEK.

Figure 6:
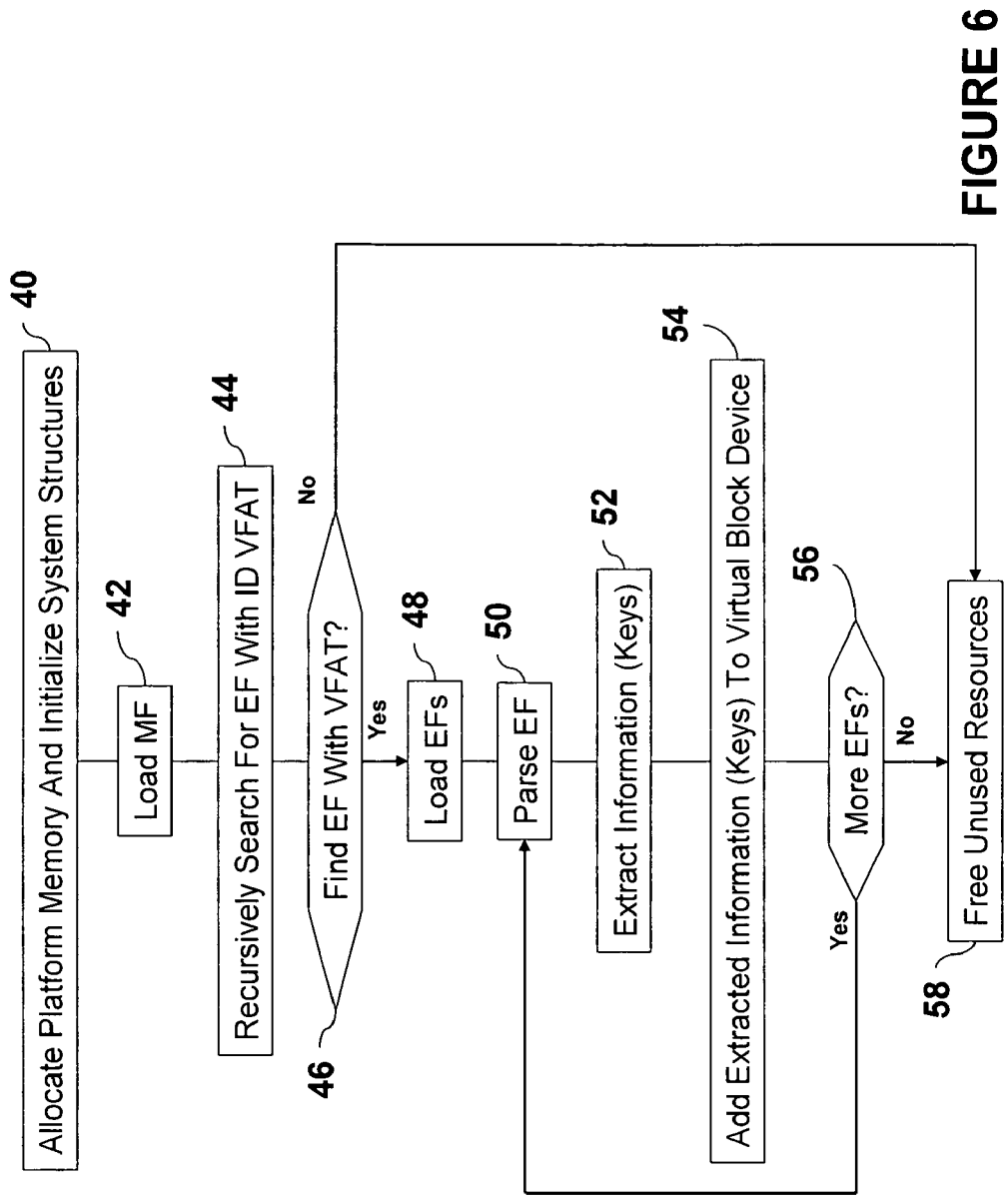
FIG. 6 is a flow diagram of an example process for generating a virtual block device in platform memory.

FIG. 6 is a flow diagram of an example process for generating a virtual block device in platform memory. At step 40, memory in the platform is allocated and any required system structures are initialized. In an example embodiment, the block device is coupled to the platform prior to execution of the boot process. The file system on the block device is implemented, in an example embodiment, as a read only FAT, having a boot sector equal to zero to prevent the platform from booting from the block device. Prior to loading the operating system on the platform, the master file of the block device is loaded into platform memory at step 42. The firmware, such as the BIOS or the EFI, recursively searches, at step 44, the master file and subordinate dedicated files on the block device for elementary files having an ID VFAT (representing an ID number). If, at step 46, no elementary files having an ID VFAT are found, unused resources are freed at step 58 and the process is ended. If, at step 46, elementary files having an ID VFAT are found, all such elementary files are loaded into platform memory at step 48. Finding an elementary file having an ID VFAT is an indication that the block device is provisioned for boot access and the generation of the virtual block device can proceed.

An elementary file is opened and parsed at step 50. In an example embodiment in accordance with the ISO 7816 specification, the elementary file is limited to a 5-byte identifier. Thus, the platform maintains a catalog of all files on the block device that are to be included in the virtual block device to allow BITLOCKER™, to use external keys having name longer than 5 bits. Information, such as BITLOCKER™ keys for example, is extracted from the parsed elementary file at step 52. At step 54, extracted information, such as BITLOCKER™ keys for example, is added to each appropriate file of the virtual block device in platform memory. If more elementary files having an ID VFAT exist (step 56), the process proceeds to step 50 and continues as described above. If no more in the elementary files having an ID VFAT exist (step 56), unused resources are freed and the process ends at step 58. Files found on the block device that are not identified in the EF as VFAT are not accessed or read and therefore not exposed.

The virtual block device is generated dynamically in platform memory. The virtual block device is generated once during the boot process (e.g., when the platform is powered up). The files of the virtual block device remain in platform memory, even if the block device is uncoupled from the platform. However, the virtual block device exists during pre-boot time and will be destroyed when the platform operating system is loaded.

Figure 7:
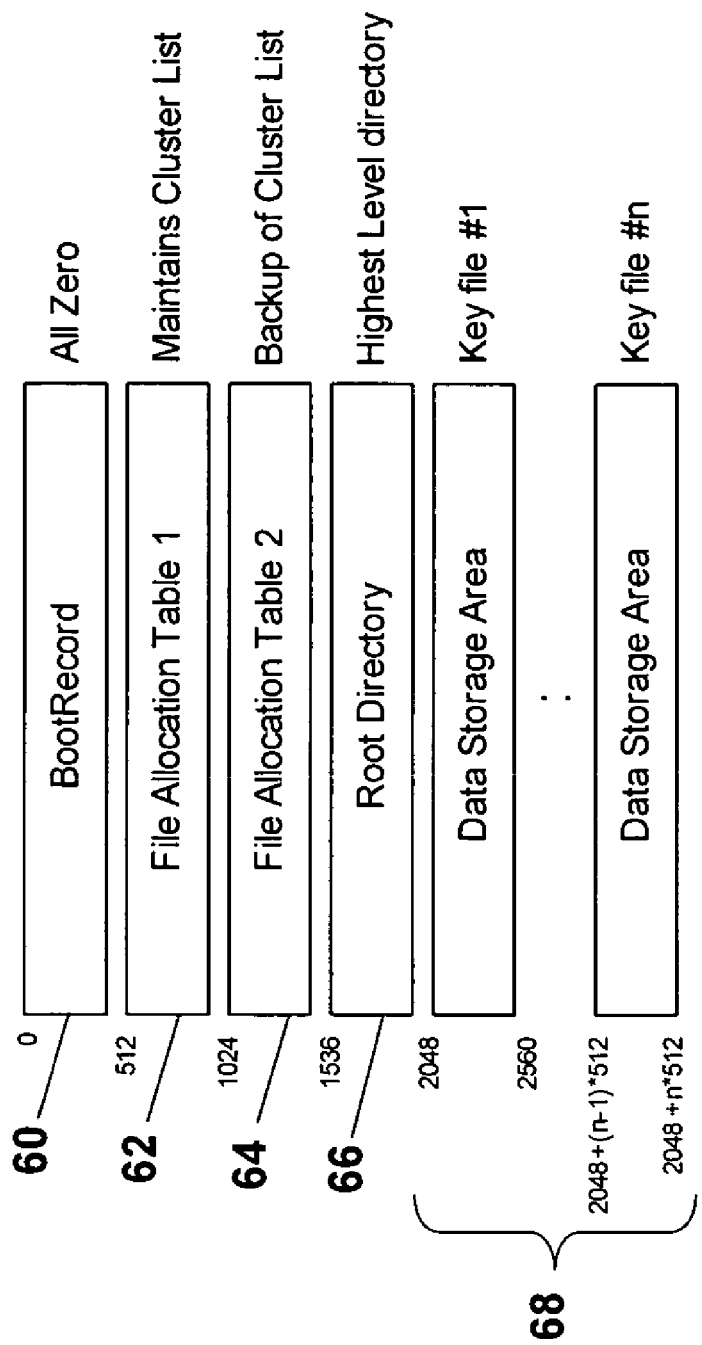
FIG. 7 is a depiction of an example allocation of platform memory for the virtual block device.

The folder hierarchy of the virtual block device will follow the hierarchy of the folders of the block device. Because only elementary files having ID VFAT are loaded unwanted files on the block device are not represented in the virtual block device. Thus, only platform memory for blocks that are actually populated with data are allocated. A depiction of an example allocation of platform memory for the virtual block device is shown in FIG. 7. As shown in FIG. 7, platform memory is allocated for a boot record sector 60, a file allocation table sector 62, a backup file allocation table sector 64, a root directory 66, and at least one data storage area sector 68. The data storage area 68 can contain information use to allow the boot process to execute, such as BITLOCKER™ key, for example. In an example embodiment, each sector comprises 512 bytes. Platform memory can be allocated in any appropriate manner, such as contiguously, for example. In an example embodiment, step 66 is performed and all other blocks are computed "on the fly" as they are requested from the boot application.

Figure 8:
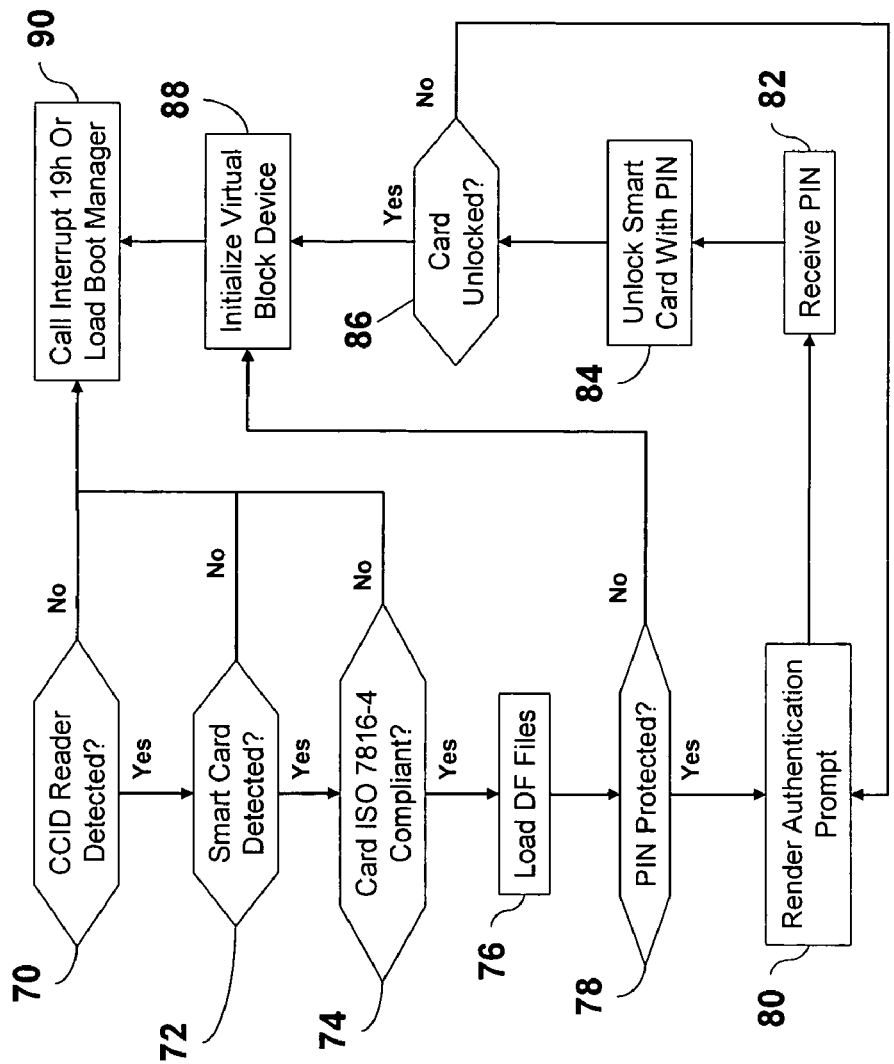
FIG. 8 is a flow diagram of an example process for accessing a CCID smart card.

As described above, the block device can comprise a CCID smart card. FIG. 8 is a flow diagram of an example process for accessing a CCID smart card. It is emphasized that the process depicted in FIG. 8 is applicable to any appropriate block device. At step 70, it is determined if the CCID card reader is detected. If the card reader is not detected (step 70), as described above, interrupt 19h is called if BIOS is implemented or the boot manager is loaded if EFI is implemented, as step 90. If the card reader is detected (step 70), it is determined, at step 72, if the smart card coupled to the card reader, is detected. If the smart card is not detected (step 72), the process proceeds to step 90. If the smart card is detected (step 72), it is determined, at step 74, if the smart card is compliant with ISO 7816-4, or any other appropriate protocol. If the smart card is not compliant (step 74), the process proceeds to step 90. If the smart card is compliant (step 74), the dedicated boot files from the smart card are loaded into platform memory at step 76.

It is determined, at step 78, if the DF boot files are protected, such as by a PIN, for example. If the DF boot files are not protected (step 78), the generation of the virtual block device in platform memory is initialized at step 88. If the DF boot files are protected (step 78), a prompt is rendered for the PIN, or the like, at step 80. The user interface (UI) utilized to allow the PIN or the like to be entered is accomplished before initial program load (IPL), or boot, code is launched. Once the control of the keyboard, display, and/or other UI devices is passed to the IPL code, the authentication prompt may not be renderable. In an example embodiment, it is expected that the smart card is coupled (e.g., inserted) into the card reader prior to supplying power to the platform.

The PIN, or the like, is received at step 82. At step 84, the PIN, or the like, is utilized to unlock the smart card. At step 86, it is determined if the smart card is unlocked. If the smart card is unlocked (step 86), the process proceeds to step 88. If the smart card is not unlocked (step 86), the process proceeds to step 80.

After the virtual block device has been successfully generated, the IPL code enumerates the virtual block device and include it in the search for BITLOCKER™ External keys, or the like. Once the key(s) has been loaded by the boot manager and the key(s) has successfully unlocked the encrypted volume(s), control is passed to the operating system loader. In an example embodiment, the storage location in platform memory of the virtual block device is neither protected, preserved, nor known by the operating system loader. Thus, operating system files are loaded and eventually can overwrite the storage space of the virtual block device.

Figure 9:
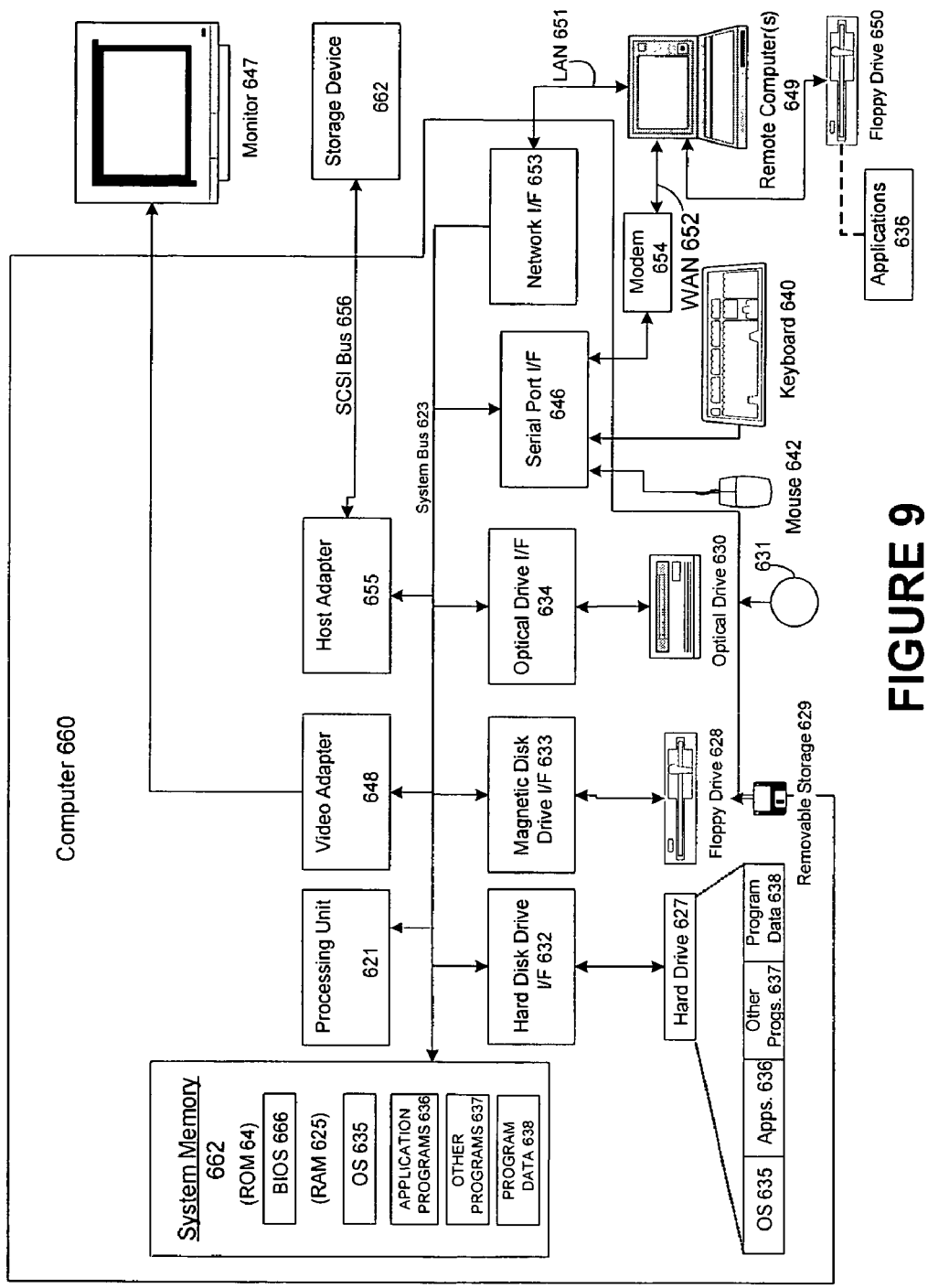
FIG. 9 is a depiction of an example computing environment in which platform authentication via a transparent second factor can be implemented.

Various embodiments of a transparent second factor for supporting authentication of a platform are executable on a computing device. FIG. 9 and the following discussion provide a brief general description of a suitable computing environment in which such a computing device can be implemented. Although not required, various aspects of transparent second factor for supporting authentication of a platform can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, authentication of a platform via a transparent second factor can be practiced with other computer system configurations, including hand held devices, multi processor systems, microprocessor based or programmable consumer electronics, network PCs, minicomputers, mainframe computers, and the like. Further, authentication of a platform via a transparent second factor also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 621, the memory (both ROM 664 and RAM 625), the basic input/output system (BIOS) 666, and various input/output (I/O) devices such as a keyboard 640, a mouse 642, a monitor 647, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with authentication of a platform via a transparent second factor as described above, such detecting the block device, opening files on the block device, searching files on the block device, generating a virtual block device in platform memory, utilizing a PIN or the like to unlock the block device, and start the boot process, for example.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 9, an exemplary general purpose computing system includes a conventional computing device 660 or the like, including a processing unit 621, a system memory 662, and a system bus 623 that couples various system components including the system memory to the processing unit 621. The system bus 623 may be any of several types of bus structures including a memory bus or memory controller, a peripheral bus, and a local bus using any of a variety of bus architectures. The system memory includes read only memory (ROM) 664 and random access memory (RAM) 625. A basic input/output system 666 (BIOS), containing basic routines that help to transfer information between elements within the computing device 660, such as during start up, is stored in ROM 664. The computing device 660 may further include a hard disk drive 627 for reading from and writing to a hard disk (hard disk not shown), a magnetic disk drive 628 (e.g., floppy drive) for reading from or writing to a removable magnetic disk 629 (e.g., floppy disk, removal storage), and an optical disk drive 630 for reading from or writing to a removable optical disk 631 such as a CD ROM or other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer readable media provide non volatile storage of computer readable instructions, data structures, program modules and other data for the computing device 660. Although the exemplary environment described herein employs a hard disk, a removable magnetic disk 629, and a removable optical disk 631, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 629, optical disk 631, ROM 664, or RAM 625, including an operating system 635, one or more application programs 636, other program modules 637, and program data 638. A user may enter commands and information into the computing device 660 through input devices such as a keyboard 640 and pointing device 642 (e.g., mouse). Other input devices (not shown) may include a microphone, joystick, game pad, satellite disk, scanner, or the like. These and other input devices are often connected to the processing unit 621 through a serial port interface 646 that is coupled to the system bus, but may be connected by other interfaces, such as a parallel port, game port, or universal serial bus (USB). A monitor 647 or other type of display device is also connected to the system bus 623 via an interface, such as a video adapter 648. In addition to the monitor 647, computing devices typically include other peripheral output devices (not shown), such as speakers and printers. The exemplary environment of FIG. 9 also includes a host adapter 655, Small Computer System Interface (SCSI) bus 656, and an external storage device 662 connected to the SCSI bus 656.

The computing device 660 may operate in a networked environment using logical connections to one or more remote computers, such as a remote computer 649. The remote computer 649 may be another computing device (e.g., personal computer), a server, a router, a network PC, a peer device, or other common network node, and typically includes many or all of the elements described above relative to the computing device 660, although only a memory storage device 650 (floppy drive) has been illustrated in FIG. 9. The logical connections depicted in FIG. 9 include a local area network (LAN) 651 and a wide area network (WAN) 652. Such networking environments are commonplace in offices, enterprise wide computer networks, intranets and the Internet.

When used in a LAN networking environment, the computing device 660 is connected to the LAN 651 through a network interface or adapter 653. When used in a WAN networking environment, the computing device 660 can include a modem 654 or other means for establishing communications over the wide area network 652, such as the Internet. The modem 654, which may be internal or external, is connected to the system bus 623 via the serial port interface 646. In a networked environment, program modules depicted relative to the computing device 660, or portions thereof, may be stored in the remote memory storage device. It will be appreciated that the network connections shown are exemplary and other means of establishing a communications link between the computers may be used.

While it is envisioned that numerous embodiments of authentication of a platform via a transparent second factor are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for authentication of a platform via a transparent second factor, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for authentication of a platform via a transparent second factor.

The program(s) can be implemented in assembly or machine language, if desired. In any case, the language can be a compiled or interpreted language, and combined with hardware implementations. The methods and apparatuses for authentication of a platform via a transparent second factor also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for managing virtual machines by property. When implemented on a general-purpose processor, the program code combines with the processor to provide a unique apparatus that operates to invoke the functionality authentication of a platform via a transparent second factor. Additionally, any storage techniques used in connection with authentication of a platform via a transparent second factor can invariably be a combination of hardware and software.

While authentication of a platform via a transparent second factor has been described in connection with the example embodiments of the various figures, it is to be understood that other similar embodiments can be used or modifications and additions can be made to the described embodiments for performing the same functions for authentication of a platform via a transparent second factor without deviating therefrom. Therefore, authentication of a platform via a transparent second factor as described herein should not be limited to any single embodiment, but rather should be construed in breadth and scope in accordance with the appended claims.

What is claimed:

1. A system comprising:
    a platform memory comprising at least one of a BIOS portion or an EFI portion comprising:
    a block device emulator configured to execute firmware to:
        detect a block device coupled to the system;
        search a hierarchical file system of the block device, for a master file and at least one dedicated file subordinated to the master file, the search directed at locating an elementary file designated as virtual file attribute table (VFAT) to indicate that the elementary file contains information to allow execution of a boot process;
        access the elementary file, while expressly not accessing other files that are not identified as VFAT, thereby preventing exposure of the other files stored in the block device;
        open the elementary file to extract at least one key for allowing execution of the boot process of the platform; and
        use the at least one key to generate a virtual block device on the platform memory for allowing execution of the boot process of the platform, the virtual block device containing a folder hierarchy that replicates the hierarchical file system of the block device;
        delete the generated virtual block device after the boot process is completed and an operating system of the platform is loaded; and
    a block device driver configured to access information on the block device.

2. A system in accordance with claim 1, wherein the block device comprises a smart card.

3. A system in accordance with claim 2, wherein the block device comprises a CCID smart card.

4. A system in accordance with claim 1, wherein the block device comprises a USB compatible block device.

5. A system in accordance with claim 1, wherein the block device comprises a PCMCIA compatible block device.

6. A system in accordance with claim 1, wherein access to the information on the block device is protected.

7. A system in accordance with claim 1, wherein the block device comprises a biometric device.

8. A system in accordance with claim 7, wherein the information accessed on the biometric device comprises a token for allowing an execution of a boot process of the system.

9. A system in accordance with claim 7, wherein the block device comprises a fingerprint reader.

10. A method comprising executing firmware for:
    detecting a block device via at least one of a BIOS portion of the platform or an EFI portion of the platform;
    searching a hierarchical file system of the block device for a master file and a plurality of dedicated files containing an indication that the dedicated files contain keys for allowing execution of a boot process of the platform and containing information for authenticating a user of a platform;
    searching the dedicated files for the keys; and
    responsive to finding the keys in the dedicated files:
        loading the keys in platform memory;
        using the keys contained in the dedicated files to generate a virtual block device on platform memory, the virtual block device containing a folder hierarchy that replicates the hierarchical file system of the block device;
        authenticating the detected block device;
        using the virtual block device for allowing execution of a boot process of the platform; and
        deleting the generated virtual block device after the boot process is completed and an operating system of the platform is loaded.

11. A method in accordance with claim 10, wherein the block device comprises at least one of a smart card and a CCID smart card.

12. A method in accordance with claim 10, wherein the block device comprises at least one of a USB compatible block device and a PCMCIA compatible block device.

13. A method in accordance with claim 10, further comprising providing an indication of authorization for retrieving the information from the block device.

14. A method in accordance with claim 10, wherein the block device comprises at least one of a biometric device and a fingerprint reader.

15. A computer-readable storage medium having a tangible physical structure, the medium having computer-executable instruction stored thereon for authenticating a platform via a block device by performing the steps of:

detecting a block device via a block device emulator of at least one of a BIOS portion of the platform and an EFI portion of the platform;

searching a hierarchical file system of the block device for a master file and a plurality of dedicated files containing an indication that the dedicated files contain keys for allowing execution of a boot process of the platform and containing information for authenticating a user of a platform;

opening the master file and the dedicated files containing the information on the block device via the block device emulator;

accessing, via a block driver of the least one BIOS portion and EFI portion, information on the block device;

searching the dedicated files for the keys; and responsive to finding the keys in the dedicated files:

using the keys contained in the dedicated files to generate a virtual block device on platform memory, the virtual block device containing a folder hierarchy that replicates the hierarchical file system of the block device;

executing a boot process of the platform using the virtual block device; and deleting the generated virtual block device after the boot process is completed and an operating system of the platform is loaded.

16. A computer-readable storage medium in accordance with claim 15, wherein the block device comprises at least one of a smart card and a CCID smart card.

17. A computer-readable storage medium in accordance with claim 16, wherein the block device comprises at least one of a USB compatible block device and a PCMCIA compatible block device.

18. A computer-readable storage medium in accordance with claim 15, wherein the block device comprises at least one of a biometric device and a fingerprint reader.

* * * * *